(12) United States Patent
Kornau et al.

(10) Patent No.: US 6,834,892 B2
(45) Date of Patent: Dec. 28, 2004

(54) SELF-ALIGNING COUPLING ASSEMBLY

(75) Inventors: Joshua R. Kornau, Greenville, SC (US); James E. Kesterman, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 10/027,097

(22) Filed: Dec. 20, 2001

(65) Prior Publication Data

US 2003/0116967 A1 Jun. 26, 2003

(51) Int. Cl.[7] .................................................. F16L 23/00
(52) U.S. Cl. ....................... 285/364; 285/367; 285/406; 285/920
(58) Field of Search ................................ 285/364, 406, 285/912, 920, 283, 412, 373, 419, 367

(56) References Cited

U.S. PATENT DOCUMENTS

| | | | | |
|---|---|---|---|---|
| RE22,337 E | * | 6/1943 | Johnson et al. .............. | 277/577 |
| 2,478,487 A | * | 8/1949 | Katzenmeyer et al. ....... | 285/406 |
| 2,551,550 A | * | 5/1951 | Smith .......................... | 285/264 |
| 2,956,818 A | * | 10/1960 | Dickerson et al. ............ | 285/18 |
| 3,306,634 A | * | 2/1967 | Groves et al. ................. | 285/7 |
| 3,508,770 A | | 4/1970 | Cassel | |
| 3,575,683 A | * | 4/1971 | Fahnoe ........................ | 337/282 |
| 3,695,635 A | * | 10/1972 | Paddington .................. | 285/38 |
| 3,744,825 A | * | 7/1973 | Cooper et al. ............... | 285/407 |
| 4,036,258 A | * | 7/1977 | Wolters et al. ......... | 137/614.04 |
| 4,040,650 A | * | 8/1977 | Shotbolt ....................... | 285/18 |
| 4,108,447 A | * | 8/1978 | Scholin ........................ | 277/553 |
| 4,229,863 A | | 10/1980 | Bowden et al. | |
| 4,249,759 A | | 2/1981 | Heckethorn | |
| 4,388,749 A | | 6/1983 | Sassak | |
| 4,393,559 A | | 7/1983 | Heckethorn et al. | |
| 4,509,763 A | * | 4/1985 | Fischer ........................ | 277/342 |
| 4,569,539 A | * | 2/1986 | Creedon ....................... | 285/18 |
| 4,622,997 A | * | 11/1986 | Paddington .................. | 137/595 |
| 4,639,020 A | | 1/1987 | Rung et al. | |
| 4,655,481 A | | 4/1987 | Prueter | |
| 4,659,116 A | | 4/1987 | Cameron | |
| 4,702,499 A | | 10/1987 | deRaymond et al. | |
| 4,812,285 A | * | 3/1989 | Stapleton .................... | 376/203 |
| 4,883,293 A | * | 11/1989 | Lawson ....................... | 285/364 |
| 5,018,548 A | * | 5/1991 | McLennan ............. | 137/315.23 |
| 5,415,439 A | | 5/1995 | Wells | |
| 5,580,099 A | | 12/1996 | Eaton | |
| 6,003,548 A | * | 12/1999 | Muchow ................ | 137/614.05 |
| 6,076,861 A | * | 6/2000 | Ikeda ........................... | 285/112 |
| 6,276,729 B1 | * | 8/2001 | Sanwald et al. ............ | 285/415 |

FOREIGN PATENT DOCUMENTS

EP          0 332 507 A1 *  3/1989   ................. 285/364

* cited by examiner

*Primary Examiner*—James M. Hewitt
(74) *Attorney, Agent, or Firm*—Dinsmore & Shohl LLP

(57) ABSTRACT

A self-aligning coupling for mating a pair of corresponding flanged fittings, generally for pipe couplings. The self-aligning coupling includes a first arm, a second arm, and a rotational assist mechanism adapted to mechanically synchronize the closing of the first and second arms relative to the flanged fittings to be connected. The rotational assist mechanism is further adapted to provide motion between the first arm and the second arm to receive and secure the flanged fittings in axial alignment.

15 Claims, 8 Drawing Sheets

SELF-ALIGNING COUPLING ASSEMBLY

TECHNICAL FIELD

The present invention relates generally to pipe couplings, and more specifically to a self-aligning coupling assembly.

BACKGROUND OF THE INVENTION

Making flexible fuel pipe connections using threaded fittings can be very difficult and time consuming when installing, for example, underground fuel piping systems at a service station. A quick connect type fitting is preferred when making these connections. In most prior art fitting configurations some axial movement of the pipes is required to properly join the pipes. Further, quick connect type fittings typically require their halves to be precisely aligned for making a connection. This alignment can be extremely difficult to achieve in the underground fuel pipe application.

In this regard, underground fuel pipe applications, fittings to be connected may be misaligned radially (see FIG. 1A) and/or angularly (see FIG. 1B). The fittings may be substantially fixed axially (see FIG. 1C showing an example of an axial gap for comparison). That is, the fittings may be attached to pipes that are fixed in the axial direction. For example, in a sump, one pipe may be buried underground and enter the sump through the sump wall, and a second pipe, to be attached to the first pipe, may be part of or attached to a T-fitting of a pipe opposite the first pipe. The T-fitting may further be attached to a horizontal pipe and a riser pipe extending upward from the fitting. Under such an arrangement both the first and second pipe would be substantially effectively fixed at their proximal ends and capable of little or no axial movement. Also, if the pipes are not on the exact same linear axis, even if only slightly offset, the pipes will be in radial and/or angular misalignment.

Further, for fuel applications, the requirements for a fitting may go beyond simply joining two pieces of pipe. Many quick connect fittings may be inappropriate and/or unsuccessful due to the number and nature of requirements placed on such a fitting, as there are several requirements and restrictions to consider that may eliminate many design options. For example, four such criteria for a fitting may be safety, reliability, low cost and ease of use. Safety is of course extremely important in the handling of flammable liquids.

Reliability of fuel connections, particularly in dispenser sumps, is important both for safety and economic reasons. Ideally, once installed, a fuel pipe and its connections can be forgotten. Servicing a fitting that develops a leak in service may require the removal of the dispenser, an expense in terms of labor and lost volume. To minimize these problems, fittings may require a design life set at 20 years or more without maintenance.

The cost of a fitting should also not exceed its functional value. If the product is to be successfully marketed, any costs must be justified to the customer. Ideally, any added cost will more be than made up by reliability, longevity and time savings.

Further, a fitting should be easy and intuitive to use. For example, quick connect fittings may be desirable over threaded fittings. By making fittings easy to use, it makes installation faster, saving both time and money. Also, because contractors unfamiliar with the product may use the fitting, the fitting's purpose and manner of operation should be as clear as possible to the uninitiated to avoid accidents. To enhance ease of use, for example, the coupling should tolerate some radial and/or angular misalignment between the fittings when making a connection.

In addition to the above requirements, there may be four other design restrictions considered: size, pipe insert, pressure drop, and the coupling engagement. The size restriction may generally be compared to the length of the fitting. In order to provide room for other equipment, such at test boots in the sump, the fitting should be as short as possible. Ideally, a quick connect fitting would be no longer than the standard primary fitting or shorter, and the other fitting dimensions should be appropriately compact to accommodate space limitations, such as allowance for only two inches from center line for pipes on four inch centers.

Where one of the fittings is to be connected to a hose opposite the end connected to the other fitting, a further size restriction on the hose insert end of the fitting should be made for compatibility with current swaging machines. The insert may retain the same dimensions as current fittings from a snap ring shoulder of the fitting to the end of the insert to take advantage of a proven design and to save contractors from having to buy new machines or setup fixtures.

Pressure drop through the fitting should not be greater than present fittings. Increased pressure drop through the fittings can increase demands on fuel pumps. A significant increase in pressure drop through a station may necessitate larger pumps, which could offset any savings from quicker installation or reduced maintenance costs. Pressure drop is used as a marketing tool in the industry and high pressure drops could hurt a new products marketing.

An additional design criteria relates to the engagement between the fittings. Because some fittings to be connected may be axially fixed, it should be possible to disassemble the joint without relative axial movement of the fitting halves. This is sometimes referred to as "zero engagement." What is required is that any overlap or engagement of the fittings not interfere with radial movement of the fittings during disassembly. This allows, for example, one of the fittings to be removed and replaced without any movement of the other fitting.

A typical fitting may consist of an insert that is swaged outwardly against a pipe and a collar. A swivel nut may be trapped on the end of the insert by a shoulder, and a rubber gasket may provide a fuel tight seal. A shorter version may be made by eliminating the nut's ability to retract axially past the seal face. Such a compact fitting allows more room for other components, such as a test boots inside a sump. Nonetheless, even disconnection of the compact fittings requires backing off of one side of the fitting from the other. This is not possible if the pipes are substantially axially fixed. As such, these previously available fittings find limited use.

As an example of a quick connect fitting, consider a KAMLOK® tee, shown in FIG. 8. The KAMLOK® tee 11 has a male nozzle fitting 12 and a female clamp fitting 14. The nozzle fitting 12 is inserted into the clamp fitting 14, the arms 16 rotate inwardly toward the body 15 of the clamp fitting 14. The arms lever or cam against the groove 13 of the nozzle 12 securing and sealing the nozzle 12 with the clamp fitting 14.

KAMLOK® fittings have several advantages. They are available in a variety of sizes and are also relatively inexpensive. However, KAMLOK®-type fittings do not always meet some key criteria and restrictions when applied, for example, in underground fuel pumping systems. First, the KAMLOK®-type fitting cannot correct misalignment of radially and/or angularly mating cylindrical surfaces, because it will tend to bind if the pipe is not well aligned. Secondly, the KAMLOK®-type fitting cannot be uncoupled without backing off one end of the fitting. In situations where substantially no axial movement is available, such a fitting has less success. Also of concern, the cam arms may vibrate loose over time, thereby potentially allowing a break in the seal and loss of containment.

In another example, push-to-connect fittings are commonly found connecting air hoses to pneumatic tools. The push-to-connect fittings are also available in a variety of sizes. These fittings create a seal by closely fitting two cylinders. As such, the push-to-connect fittings cannot tolerate misalignment. They also require that one end be backed off of the other for disengagement.

In yet another example of commercially available fittings, quarter turn, facial fittings go together very quickly and smoothly if aligned properly. One disadvantage of this fitting may be its relatively high cost. Besides the cost issue, there are several other deficiencies. Despite the open face, the overlap that allows the fitting to lock together similarly requires backing off of the mating parts to disconnect. Also, in order to couple, the faces have to be brought together in a parallel manner, and virtually no angular misalignment can be tolerated.

Installation of primary piping to elbows, tees, and other primary pipe fittings, is typically done by at least two people. In a conventional installation, for example, one person holds one pipe while another person aligns a fitting on one end of the pipe with another fitting to which the first pipe fitting will be received. With previously available arrangements, one person could not practically perform this installation, and conventional couplings and fittings cannot be joined if there is any appreciable misalignment between the fittings.

Where two pipes or two pipe fittings may each be fixed at opposite ends, axial movement of mating ends of the pipe will be minimal. The self-aligning assembly of the present invention should address and minimize the problems herein discussed and other problems which may become obvious to one skilled in the art.

SUMMARY OF THE INVENTION

The present invention relates to self-aligning coupling for mating a pair of axial arranged first and second flanged fittings. The self-aligning coupling comprises a first arm, a second arm, and a rotational assist mechanism. The rotational assist mechanism is adapted to mechanically synchronize the closing of the first and second arms relative to the flanged fittings to be connected. The rotational assist mechanism is further adapted to provide motion between the first arm and the second arm to receive and secure the second flanged fitting.

In another embodiment, a self-aligning assembly mates a pair of axial arranged first and second pipes. The second pipe has a flanged mating end and both pipes are substantially fixed opposite their mating ends. The self-aligning assembly comprises a flanged fitting and a self-aligning coupling. The flanged fitting is adapted to attach to the mating end of the first pipe. The self-aligning coupling has a first arm and a second arm. The first arm has a base end and a receiving end. The first arm base is pivotally connected adjacent to the flanged fitting when in use. The second arm has a base end and a receiving end. The second arm base is pivotally connected adjacent to the flanged fitting when in use. The second arm base engages the first arm base. The receiving ends of the arms uniformly move between an open position and a closed position to receive and secure the flange of the second pipe.

In yet another embodiment, a self-aligning coupling for mating a pair of corresponding flanged fittings comprises a pair of arms and a rotational synchronizer. The pair of arms are adapted for pivotal connection between opened and closed positions, and the arms at least partially defining a mating groove adapted to receive at least portions of a pair of flanged fittings to be coupled. The rotational synchronizer is provided adjacent the arms and is adapted to facilitate movement of the arms such that the flanged fittings can be received in the mating groove as the arms are effectively pivoted to the closed position.

BRIEF DESCRIPTION OF THE DRAWINGS

While the specification concludes with claims particularly pointing out and distinctly claiming the present invention, it is believed that the same will be better understood from the following description, taking in conjunction with the accompanying drawings, in which:

DETAILED DESCRIPTION OF EXEMPLARY EMBODIMENTS

Reference will now be made in detail to various exemplary embodiments of the invention, several of which are also illustrated in the accompanying drawings, wherein like numerals indicate the same elements throughout the views, and the same last two digits represent similar elements in different embodiments.

According to one embodiment, the self-aligning assembly of the present invention comprises a self-aligning coupling that aids in mating a pair of axial arranged flanged fittings by attaching to a first fitting and by receiving and holding a second flanged fitting. The flanged fittings may be part of or attached to another fitting such as a pipe tee. For example, they may screw onto or weld to a pipe, may simply include a flange welded to a pipe, or may otherwise be attached to a pipe as would be obvious to one skilled in the art.

Figure 1A:
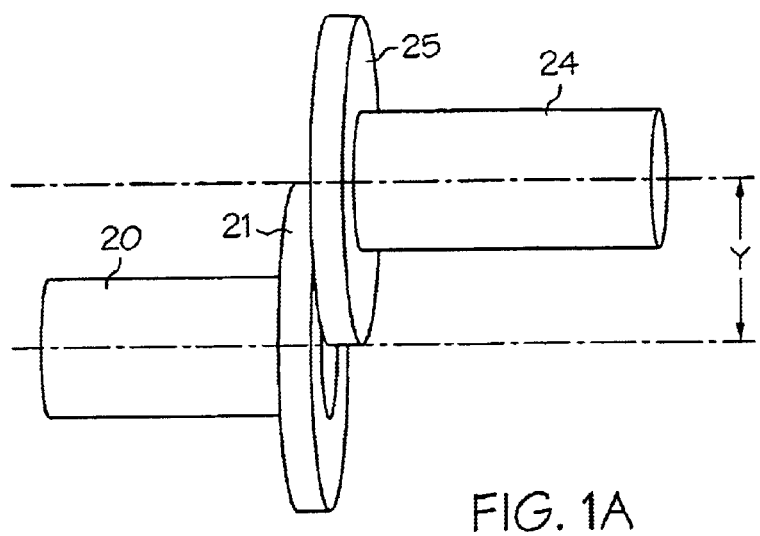
FIG. 1A is a partial perspective view of two flanged fittings for a coupling assembly shown in radial misalignment.
Figure 1B:
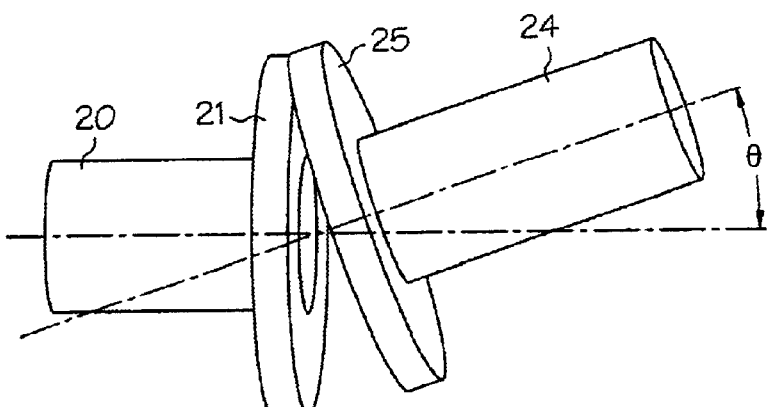
FIG. 1B is a partial perspective view of two flanged fittings for a coupling assembly shown in angular misalignment.
Figure 1C:
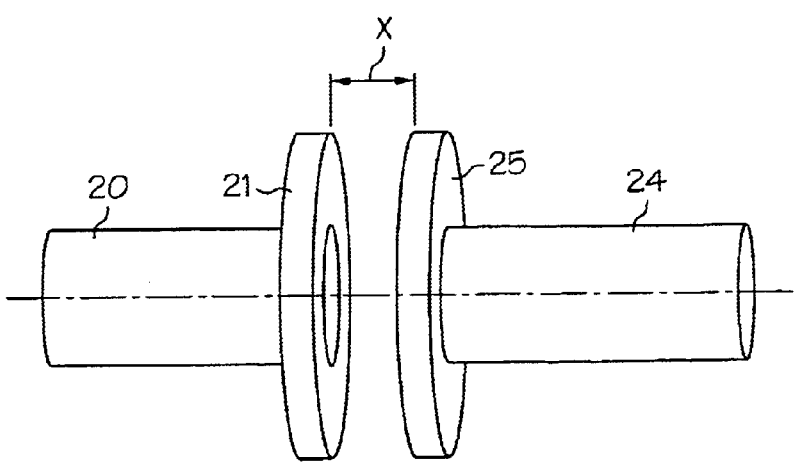
FIG. 1C is a partial perspective view of two flanged fittings for a coupling assembly shown having an axial gap.

The axially arranged flanged fittings may be misaligned but are capable of being aligned in the radial, angular and axial directions. For example, FIG. 1A shows the radial misalignment "Y" of a first flanged fitting 20 having a first flange 21 with a second flanged fitting 24 having a second flange 25. FIG. 1B shows the angular misalignment "θ" of the first flanged fitting 20 with the second flanged fitting 24. Lastly, FIG. 1C shows the axial gap "X" of the first flanged fitting 20 with the second flanged fitting 24. The flanges are generally capable of being brought into alignment without damaging the flanges, attached pipes, or other structures such as a wall or brace.

According to one embodiment, where a first fitting is to be mated with a misaligned second fitting, the coupling of the present invention allows such a misaligned second fitting to self-align to the first fitting as the assembly is brought to its closed position and tightened. The coupling may be temporarily engaged with the second fitting by simply pushing it into place. Potentially, this makes at least this part of the installation a one person job.

Figure 2:
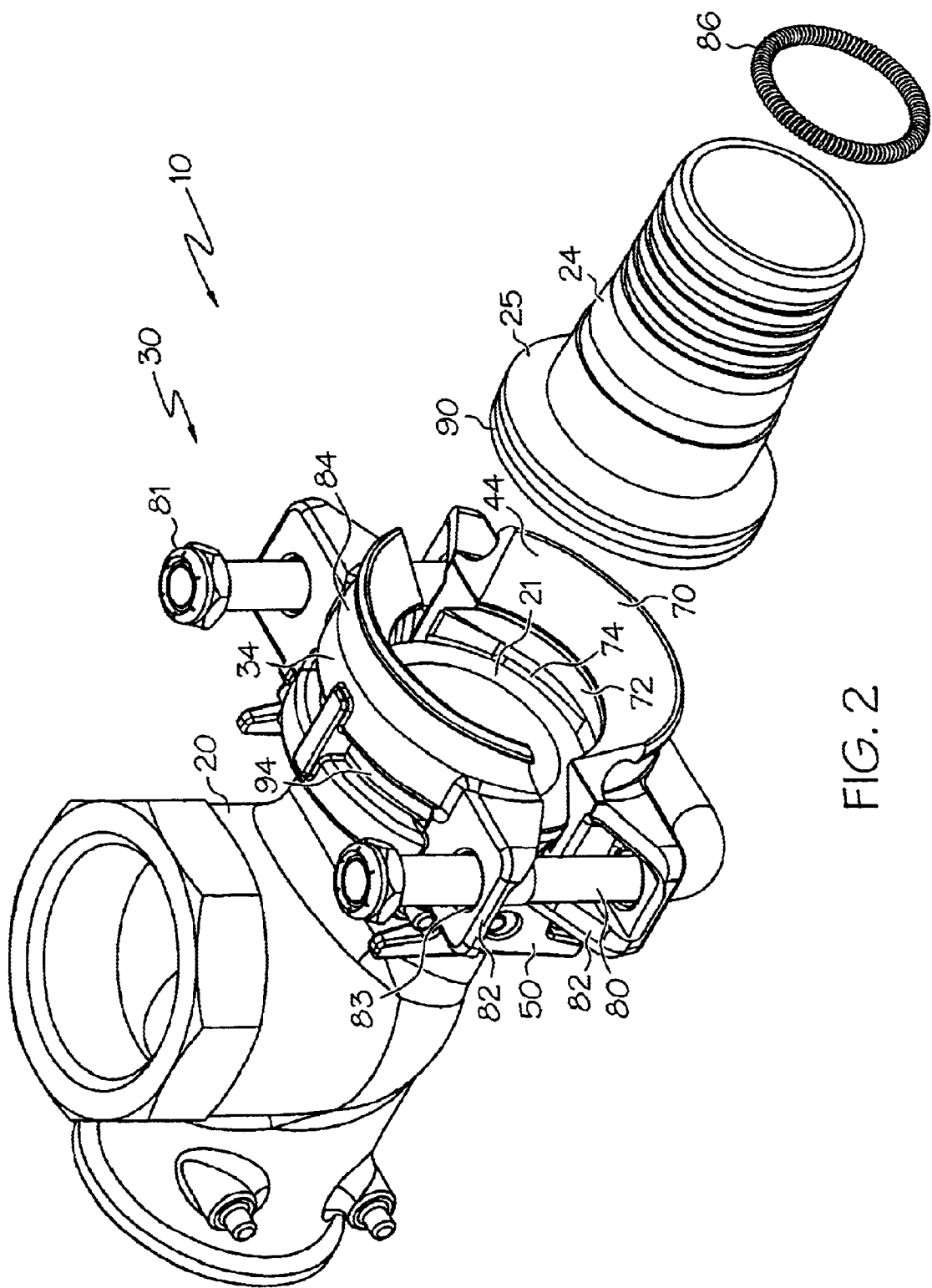
FIG. 2 is a perspective view of an embodiment of a self-aligning assembly made in accordance with the present invention.

More particularly, and as illustrated in one embodiment in FIG. 2, the self-aligning assembly 10 of the present invention might comprise a self-aligning coupling 30 attached to a first flange fitting 20 having a first flange 21. As seen, the self-aligning coupling 30 receives a second flanged fitting 24 having a second flange 25. The self-aligning coupling 30 mates and aligns the second flange 25 with the first flange 21.

As seen in this example, the self-aligning coupling 30 comprises a first arm 34 and a second arm 44. The first arm 34 and the second arm 44 are interconnected in a manner creating a jaw-like motion that simultaneously and synchronously clamps and aligns the second flange fitting 24 with the first flange fitting 20. The first arm 34 and the second arm 44 are symmetrically hinged to move in unison. The motion is kept in unison in this exemplary arrangement by gearing the two halves together using a rotational synchronizing gearing arrangement 50. One advantage in using symmetrical halves to form a jaw-like motion includes allowing the assembly to be formed from only one part. That is, the first arm 34 and the second arm 44 may be made identical in this embodiment.

However, and as will be understood by those skilled in the art, a variety of configurations may be used for the first arm and the second arm arrangement to synchronously clamp and align the first flange and the second flange in an installed position without deviating from the scope of the current invention. The synchronization of the arms from between the open and closed positions may comprise any structure or arrangement of a clamp or fastener.

Figure 3:
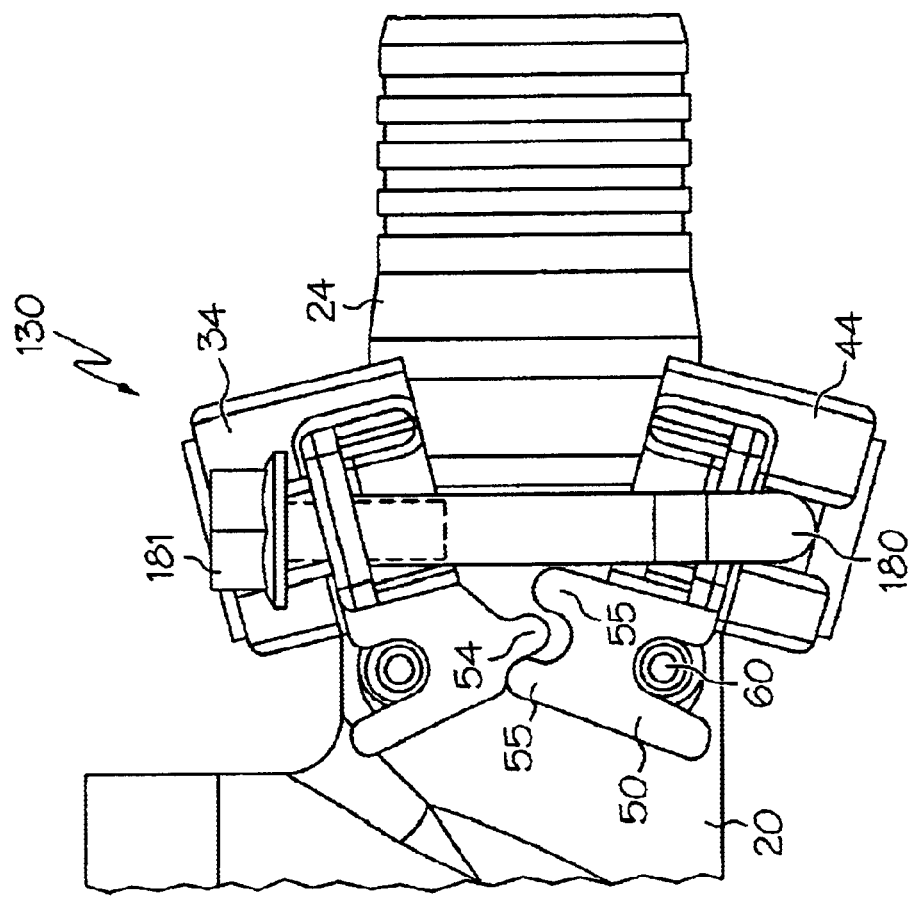
FIG. 3 is a side view of another embodiment of a self-aligning assembly made in accordance with the present invention.

In another embodiment and as seen in FIG. 3 the clamping mechanism comprises a J-bolt arrangement, and the first arm 34 and the second arm 44 pivot about projections 60 formed on the first flange fitting 20. The projections 60 not only act as pivot points, but are critical for the alignment of the self-aligning assembly 130 to receive and secure the flanges 21, 25. The projections 60 may be formed by tapping threaded holes in the flanged fitting and screwing on the projections or by welding the projections to the fitting. Other methods of attaching the projections may be used as may be obvious to one skilled in the art. As will be understood, any structural arrangement for holding the arms in closed position could equally be substituted.

As best seen in FIG. 2, the first arm 34 and second arm 44 are designed such that they receive the first flange 21 and the second flange 25. The first flange 21 and second flange 25 may be chamfered. In this example, the first arm 34 and second arm 44 form a mating groove 74 that aligns against the first flange 21 and the second flange 25 of the fittings to bring the flanges into a mating and aligned condition, and, in some embodiments, to also seal the first flange 21 and the second flange 25. In the FIG. 2 embodiment, the first flange 21 and the second flange 25 may be sealed in connected or closed position with respect to one another, such as by way of a seal 90. In additional embodiments, the seal may comprise an O-ring, a U-shaped seal, or a liquid seal in the mating groove.

In the embodiment of FIG. 2, when attached together in a clam-shell type arrangement as shown (e.g., FIGS. 2–4), the arms form a lead-in, such as a conical shape self-alignment portion 72 of an interior surface 70, that helps align the second flange 25 in the mating groove 74 with the first flange 21. Accordingly, as the second flange fitting 24 is inserted into the assembly 30 towards the mating groove 74, the lead-in aligns the second flange 25. It is contemplated that the combination of the motion of the arms (to be discussed in detail later), with the self-alignment portion 72, should allow up to about 10° of angular misalignment. Once inserted, the first arm 34 and the second arm 44 can be tightly clamped together. The clamping may aid the first flange fitting 20 to seal with the second flange fitting 24.

Many options exist for fastening or clamping the arms together, such as by a simple clip or pin, band clamps or swing bolts, or by having a threaded fastener on each side of the arms. As seen in FIG. 2, the arms 34 and 44 of the self-aligning assembly 30 of this example each have a pair of ears 82, each having a bore hole 83 therethrough. As assembled, each of the ears 82 of the first arm 34 line up with an ear 82 of the second arm 44 such that the bore holes 83 are aligned. The legs of a U-bolt 80 are slid through aligned bore holes 83 of the arms 34, 44. Typically, and as shown in FIG. 2, the threaded ends of the U-bolt (not shown) might extend upward from the first arm 34 to allow easy access and connection of the clamp nuts 81 from above when, for example, the self-aligning assembly 30 is assembled in an underground sump. As would be obvious to one skilled in the art, the U-bolt 80 could be assembled in the opposite direction, for example, when the self-aligning assembly 30 is assembled in an overhead configuration or as would otherwise be ergonomical in a given application.

One advantage associated with the unitary U-bolt 80 design may be that nothing (e.g., other parts, nuts, collars, etc.) needs to be held at the end of the assembly opposite the installer. Moreover, any load placed upon the assembly 30, once installed, is focused on the U-bolt 80, allowing the structural design to focus on the robustness of the clamp. If access to the seal 90 between the fittings 20, 24 is necessary, the assembly can also be broken down without having to move the axial aligned pipes. That is, the U-bolt may hold one arm, for example second arm 44, in close enough proximity to the fittings 20, 24 to hold the fittings within the groove 74 and essentially maintain alignment therebetween, as the bolts 81 and possibly first arm 34 are removed. The assembly should then be loose enough to remove the seal 90 without misaligning the fittings 20, 24. A new seal, the first arm 34 and the bolts 81 may then be reinstalled.

In alternative embodiments, threaded fasteners may be used on each side of the arms. In one embodiment of such a fastener and as shown in FIG. 3, the clamping of the self-aligning coupling 130 is accomplished by using J-bolts 180 and flange nuts 181. In other alternative embodiments the clamp may be two sets of nuts and bolts, a spring, or any other biasing member capable of securing the arms of the self-aligning assembly.

Where ears 92 are provided on each side of the arms 34, 44, the arms may need to be turned 90° to allow easy access to the bolts 80 with a socket wrench. Also, the arms may be spring loaded such that the first flanged fitting could be snapped in before tightening. This may allow the user a free hand while assembling the joint.

Figure 4:
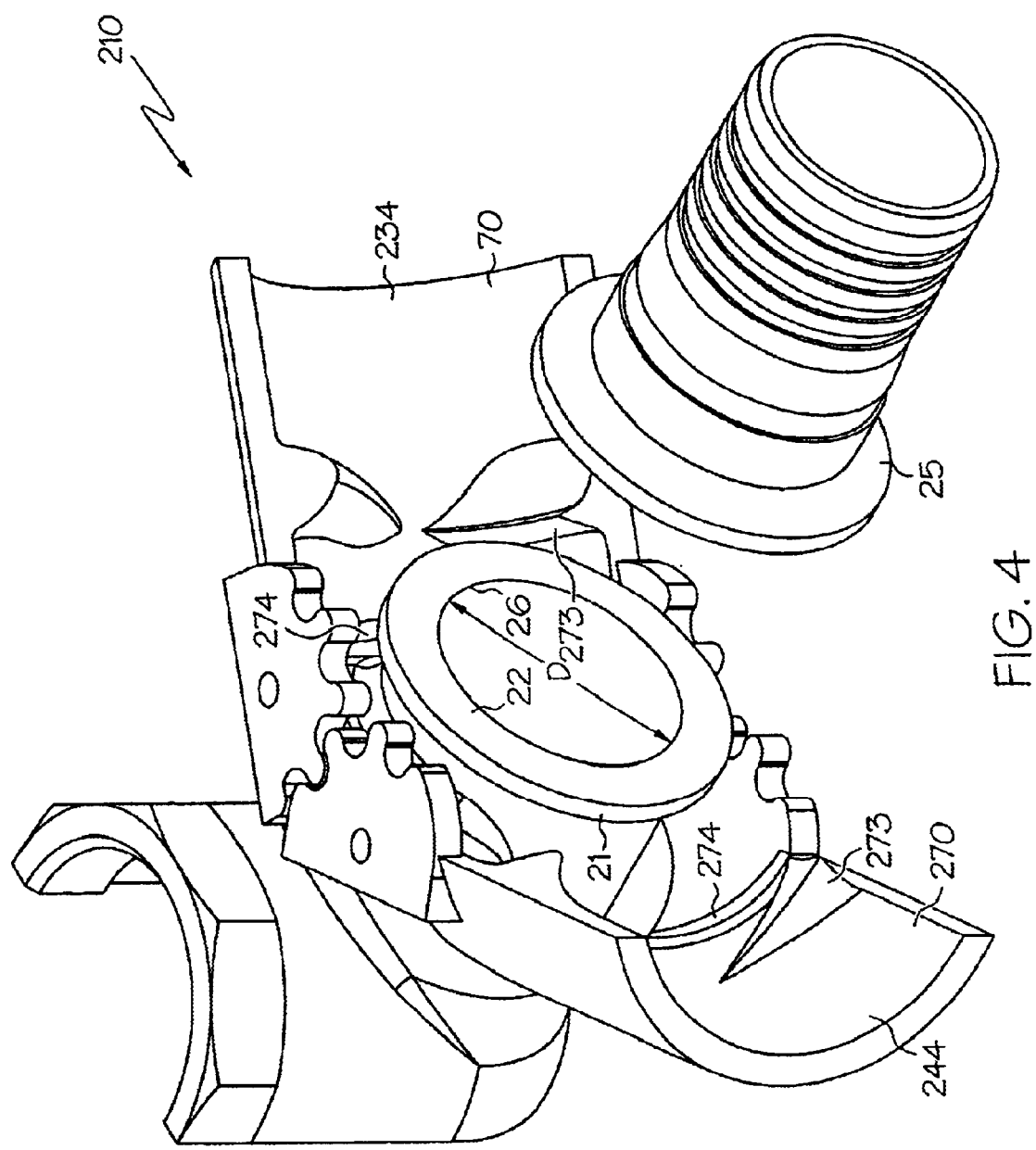
FIG. 4 is a perspective view of yet another embodiment of a self-aligning assembly made in accordance with the present invention and illustrated in the "open position"
Figure 5:
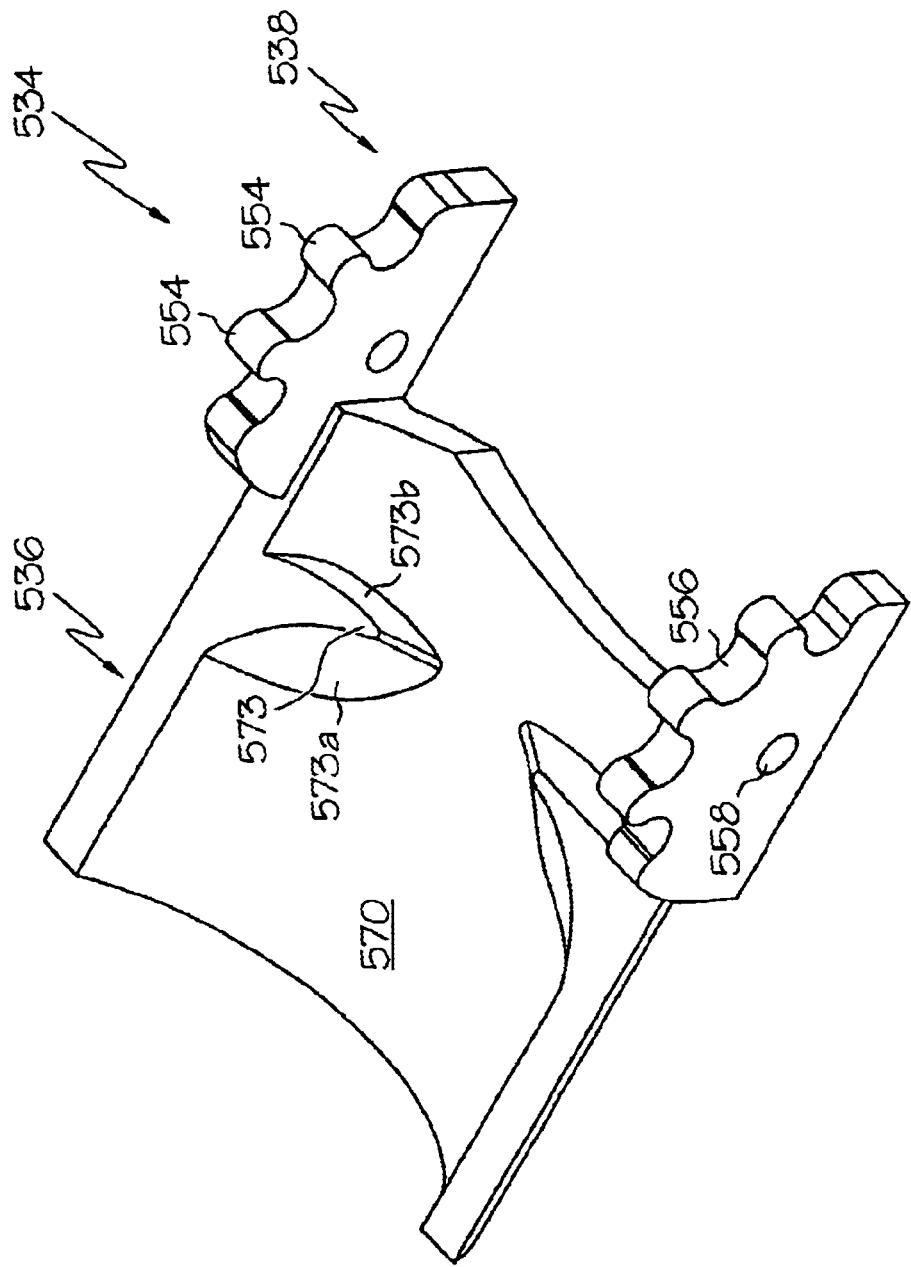
FIG. 5 is a perspective view of one embodiment of a self-aligning coupling arm made in accordance with the present invention.
Figure 6:
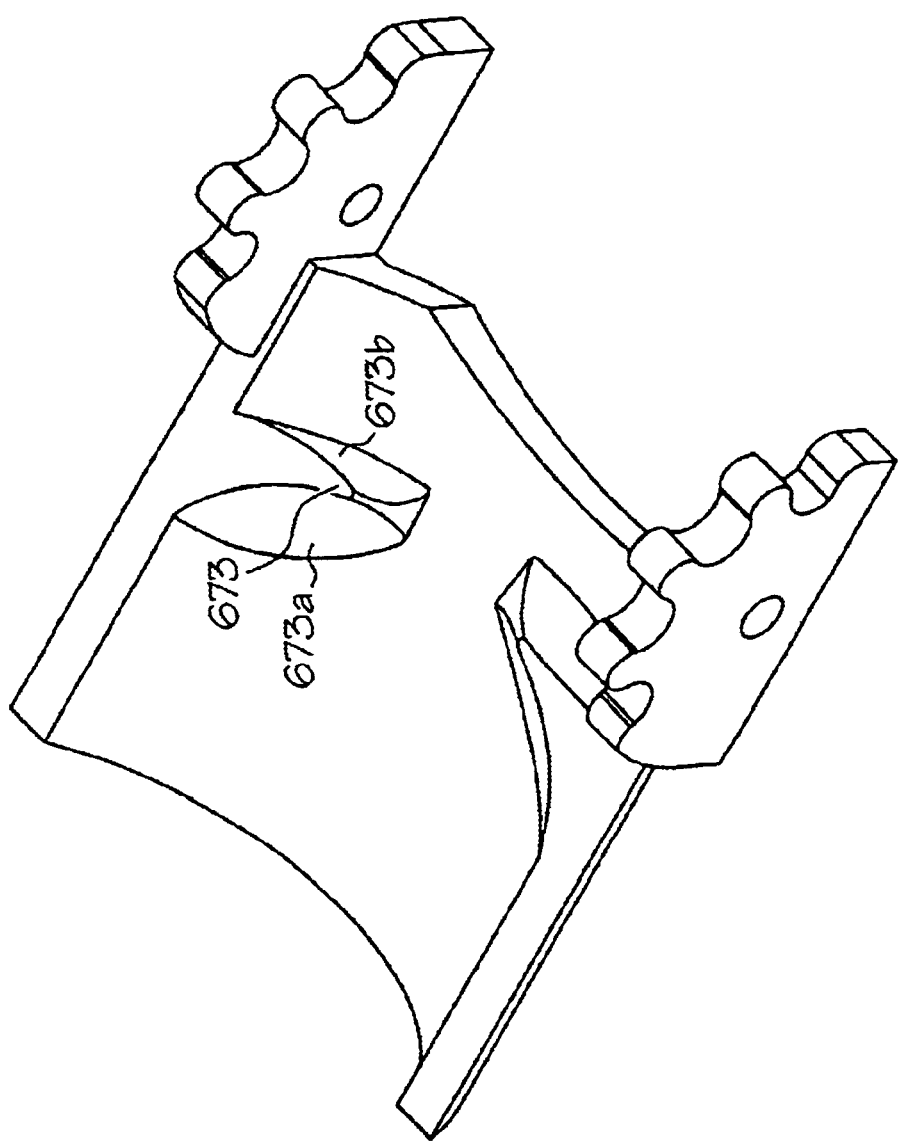
FIG. 6 is a perspective view of another embodiment of a self-aligning coupling arm made in accordance with the present invention.
Figure 7:
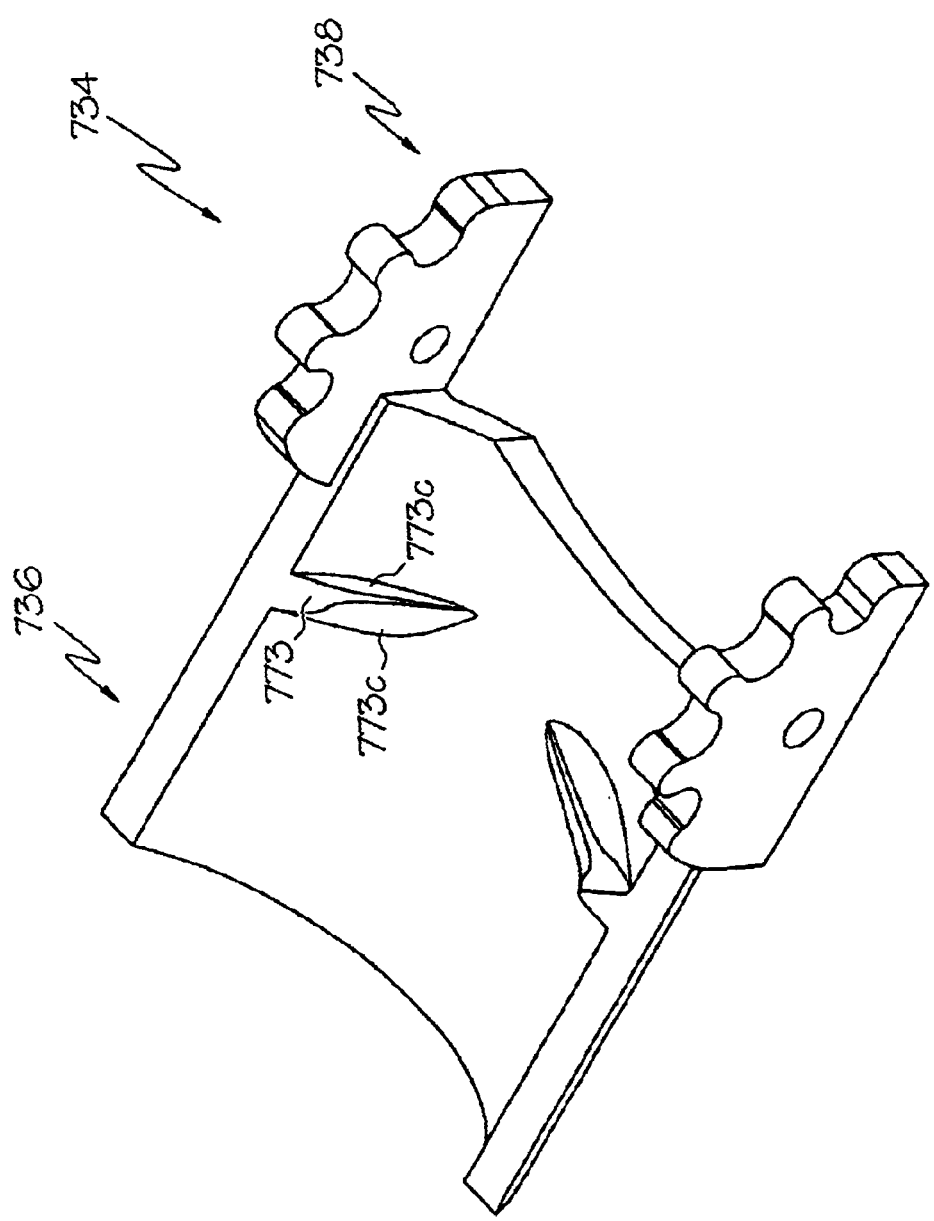
FIG. 7 is a perspective view of yet another embodiment of a self-aligning coupling arm made in accordance with the present invention.
Figure 8:
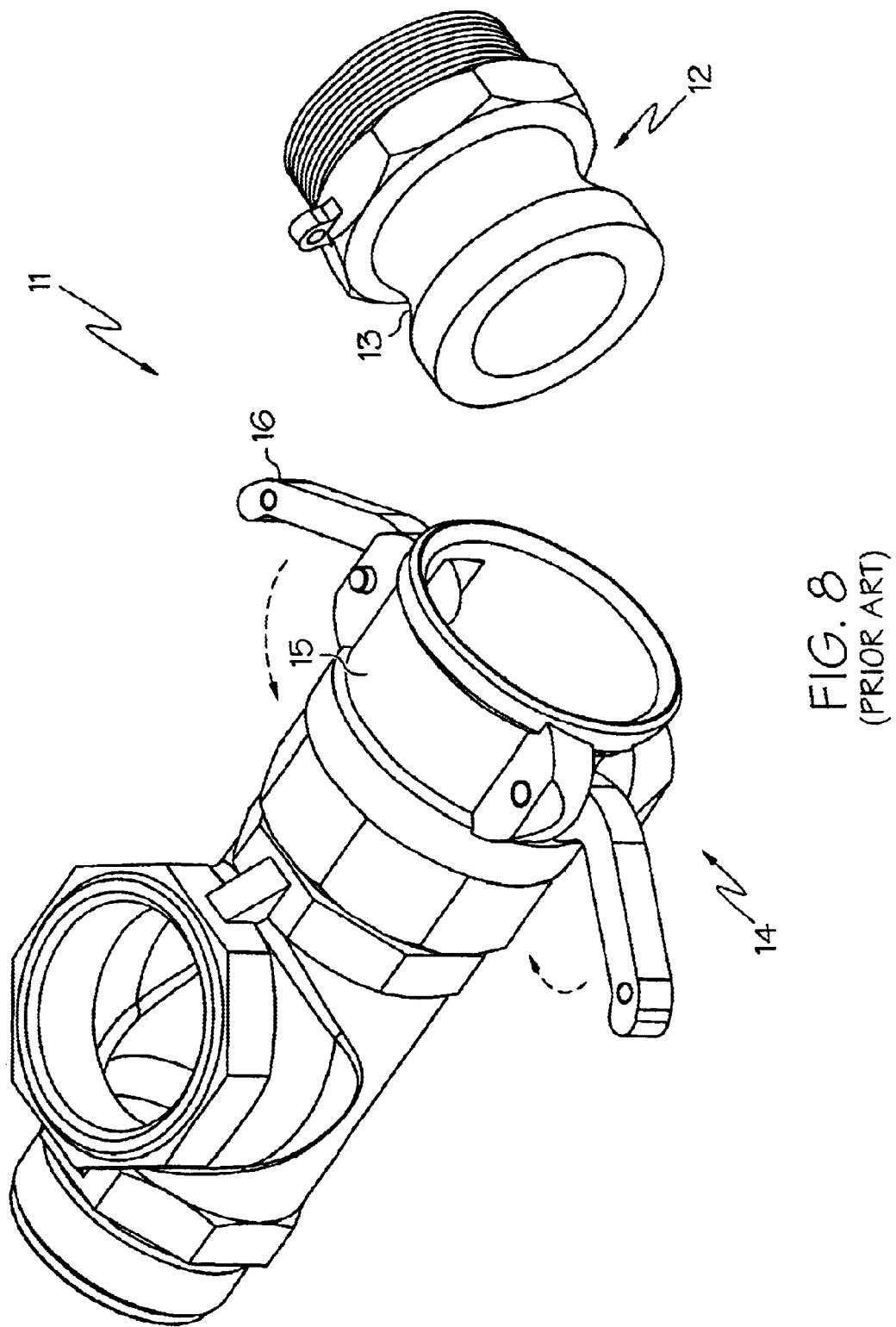
FIG. 8 is a perspective view of a KAMLOK® tee coupling assembly of the prior art.

In yet another exemplary embodiment and as illustrated in FIG. 4, the self-aligning coupling assembly's 230 jaw-like configuration simultaneously provides both a centering action and a drawing-in action. The two arms 234, 244 have a pair of nubs 273 each extending from and are part of the interior surface 270. Nubs 273 can be placed about 90° apart to create a V-block configuration. When the arms 234 and 244 move toward the closed position, they tend to snag on the second flange 25 of the second fitting 24. The nubs 273 have a conical surface directed toward the mating groove 274. As the nubs 273 come into contact with the second flange 25, the nubs 273 begin to center the flange 25 with the first flange 21. Simultaneously, the conical surface of the nubs provide a draw-in action as the assembly is moved forward its closed position because the slope of the nub 273, along with the force of closing the coupling 230, draws the flange 25 toward the groove 274. In alternative embodiments and as seen in FIGS. 5, 6 and 7, the arms may not have mating grooves yet comprise the nubs.

The self-centering action should ease alignment problems. There should also be no disassembly problem because the arms 234, 244 swing clear of the joint face or interfacing surface 22, i.e., the interface between the flanges 21, 25. This embodiment should also handle radial misalignment very well. The self-alignment coupling 230 of this embodiment may, for example, pull together the two halves with up to ½ inch radial misalignment on a 4" diameter pipe. This range of coupling is desirable as it reduces the amount of effort required to start the coupling. Also, the self-aligning coupling requires low clamping pressure to hold against a large axial pull force. Thus, a locking or clamping mechanism (such as seen in FIG. 2 as 80) will not have to be extremely beefy or powerful.

As may also be seen in FIG. 4, by aligning the fittings 20, 24, the diameter D of the fittings are not changed at the flanges 21, 25. The internal surface or fluid flow surface 26 of the coupling assembly 210 does not substantially disrupt fluid flow adjacent the interfacing surface 22. Thus, pressure drops across the assembly 10, if any, will be minimal.

As previously discussed, the two arms of the coupling assembly may be identical to simplify the design and possibly decrease cost. As an example, FIG. 5 shows an arm 534 made for a coupling assembly in accordance with the current invention. The arm has a clamshell portion 536 and a base 538. The clamshell has an interior surface 570 and two nubs 573 extending from the interior surface. The nubs have a receiving side 573*a* and a positioning side 573*b*. When the flange of a fitting contacts the receiving side 573*a*, the slope of the receiving side, along with the force of closing the assembly begins to align the second flange with the first flange to be mated thereto. As the flange contacts the positioning side of the nub 573, the flange is directed toward the groove and becomes snagged by the nub thereby tending to hold the flanged fitting in place. In this configuration the angular misalignment may be corrected up to about 6°.

In another embodiment, and as shown in FIG. 6, the shape of nubs 673 inside an arm 634 of the self-aligning coupling assembly 630 are tapered or sloped to cam the fitting together. The pair of angled nubs 673 are shown having a receiving surface 673*a* and an alignment surface 673*b* where the alignment surface 673*b* is more sloped than the alignment surface 573*b* from FIG. 5. This shape may improve the angular misalignment correction up to about 10°. The self-aligning coupling assembly 630 may also be, for example, capable of pulling the pipe in from a distance of about 0.5 to 0.6 inches of radial misalignment for a 4 inch diameter pipe.

In yet another embodiment and as shown in FIG. 7, the nubs 773 have an additional surface, ramping surface 773*c*, added at the outside end of the nubs 773, that slopes toward the base 738 and shortens the extension of the nub 773. This shape may improve the angular misalignment correction up to about 15°.

The relative ease, rate, distance of rotation, and size of the coupling assembly may be controlled primarily by the rotational assist mechanism. In one embodiment, the bases of the arms and the projections in a first flanged fitting make up the synchronized rotational assist mechanism. In other embodiments, the rotational assist mechanism may not be synchronized but may have members adapted to independently rotate the orientation of the two arms, or possibly just one of the arms, in opened or closed positions. In yet other embodiments, the a rotational assist mechanism is a rotational synchronizer and may have any first and second interacting members adapted to mechanically synchronize rotational orientation of the two arms as they are opened or closed. The rotational synchronizer may typically be a gearing arrangement. As seen in FIG. 3, the gearing arrangement 50 comprises one interlocking tooth 54 on the first arm 34 and two interlocking teeth 55 on the second arm 44. The single tooth 54 on the first arm 34 rotates within the saddle or gap between the two teeth 55 on the second arm 44 to allow synchronized opening and closing movement of the arms.

In some embodiments and as shown in FIG. 5, the base 538 of an arm 534 has multiple teeth 554 for interlocking with another, and possibly identical, arm. The teeth have a contact surface 556. The arm opens or closes as the arm rotates about a fixed or cammed pin position 558. The interlocked teeth 554 of two arms come into and out of contact along various points on the surface 556 of the teeth 554. The rotation of the arms causes a rocking action of the teeth wherein the teeth may cause the arms to tend to clamp shut, possibly eliminating the need for any other clamping device to secure the flanges. The teeth could also cause the two arms to disengage, allowing one of the arms to be removed from the assembly. Because it is likely that the fittings could be installed near the bottom of a sump, in an additional embodiment, the gears may disengage after opening partially so the upper arm can be moved independently when the lower arms reaches the bottom of the sump.

In another embodiment, smaller gears may allow the assembly to be shortened making the coupling assembly of the current invention shorter than many current compact fittings on the market.

By hanging the bolts from the top arm, it is also possible to make the fitting self closing without a spring by use of gravity. In this embodiment, the pins no longer carry any load but are for aiding assembly. The drilled holes in the arms may now be slots, as shown in FIG. 3. The projections 60 in the first flanged fitting 20 may be cast features, because they can be aligned 90° to the parting line. This could remove the drilling and pressing steps for four pins from the process.

A garter spring 86 can also be used with the assembly 10 in FIG. 2. The garter spring 86 can be used to keep the arms 34, 44, together during the assembly and insertion stage. For example, the garter spring 86 can be received about a garter groove 84 (formed when the halves are assembled together). Advantages of using a garter spring in lieu of other options may include ease of assembly, inexpensiveness, and a potential addition of some retaining force. However, other similar biasing devices, such as a variety of springs or rubber straps, may be used as should be obvious to one skilled in the art.

A further feature of such an embodiment is that the parts can be cast such that an access space 94 can be opened through the assembly such that the seal (shown as 90 in FIG.

2) can be visibly observed (e.g., to check for proper installation). Additionally, other advantages of the self-aligning assembly of the present invention is that the assembly can be easily installed within an access chamber, such as a sump. It is contemplated that the self-aligning coupling can be used in conjunction with, for example, elbows, keys, adaptors and other fittings.

Safety is extremely important in the handling of flammable liquids. As is known to those skilled in the art, one safety requirement is that fittings should be fuel tight at five times the pressure rating of the pipe. For example, the pipe may be rated at 75 psi, thus the fitting should be testable to 375 psi. In addition to pressure testing requirements, the coupling should be designed to survive exposure to fire. Occasionally dispenser fires happen. A coupling or fitting should withstand the fire to prevent additional sources of fuel to the fire. Thus, the material selection for the self-aligning coupling should consider these safety requirements.

The materials for the self-aligning coupling may include ductile iron, zinc plated iron, zinc plated Z1018 bar stock or aluminum. Typically, the arms will be made of aluminum. The arms may be cast by die casting and permanent mold methods as may be known by those skilled in the art, allowing for relatively low piece prices with tight tolerances. Cast aluminum is generally resistant to stress corrosion cracking. This may be important as the arms are subject to high tinsel loading in a potentially corrosive environment. One concern, however, is that aluminum is anodic to steel and is subject to galvanic currents in this application. In additional embodiments, the arm could be cast without cores or sites by eliminating some undercuts. In addition, the investment cast method, die cast method, and permanent mold method may be found to provide a tolerance range that eliminates the need for machining. If cast in aluminum either by die casting or permanent mold casting, the arms could be produced at a minimum of cost. Additionally, the self-aligning coupling assembly may be made of a variety of materials for various applications. These materials may include brass, stainless steel, various composites or plastics.

Having shown and described the preferred embodiments of the present invention, further adaptations to the self-aligning coupling assembly of the present invention can be accomplished by appropriate modifications by one of ordinary skill in the art without departing from the scope of the present invention. Several of these potential modifications and alternatives have been mentioned, and others will be apparent to those skilled in the art. While exemplary embodiments of the inventive system in process have been discussed for illustrative purposes, it should be understood that the elements can be substituted for particular applications, and/or constantly updated and improved by technological advances. Accordingly, the scope of the present invention should be considered in terms of the following claims and is understood not to be limited to the details of structure, operation or process steps as shown and described in the specification and drawings.

We claim:

1. A self-aligning coupling for mating a pair of axial arranged first and second flanged fittings, the coupling comprises:
    a) first and second arms adapted for pivotal connection to one another, and having open and closed relative pivotal positions in use, wherein the first and second arms further comprise outwardly extending ears having apertures;
    b) a rotational assist mechanism adapted to mechanically effectuate the closing of the first and second arms relative to a pair of flanged fittings to be connected in use, and further adapted to provide motion between the first arm and the second arm to receive and secure the second flanged fitting; wherein the first and second arms are rotatable about an axis which is substantially parallel to the facing planar surfaces of the flanged fittings and
    c) a fastener received in the apertures for further securing the arms in the closed position.

2. The self-aligning coupling of claim 1, wherein the fastener comprises a C-clamp.

3. The self-aligning coupling of claim 1, further comprising a garter spring arranged to normally bias the arms toward the closed position.

4. The self-aligning coupling of claim 3, wherein the first and second arms further comprise a garter groove to at least partially receive the garter spring in use.

5. The self-aligning coupling of claim 1, further wherein each half comprises a single mating groove adapted to receive the flanges of the pair of flanged fittings in use.

6. The self-aligning coupling of claim 1, wherein at least one of said arms further comprises a self-alignment surface wherein the self-alignment surface angularly aligns the second flanged fitting with the first flanged fitting in the closed position.

7. The self-aligning coupling of claim 1, further comprising a mating groove at least partially defined by a portion of each arm.

8. The self-aligning coupling of claim 7, further comprising a seal disposed within the mating groove in use.

9. The self-aligning coupling of claim 1, wherein the rotational assist mechanism comprises first and second interacting members adapted to mechanically synchronize rotational orientation of the two arms as they are pivoted in use.

10. The self-aligning coupling of claim 1, wherein the arms are hingedly oriented in a clamshell arrangement relative to one another in use.

11. The self-aligning coupling of claim 1, further comprising a seal for providing sealed fluid communication between the first flanged fitting and the second flanged fitting.

12. The self-aligning coupling of claim 1, further comprising an interior surface having a conical self-alignment portion adapted to orient the second flanged fitting relative to the first flanged fitting.

13. The self-aligning coupling of claim 12, wherein the self alignment portion is adapted to orient the two flanged fittings from a maximum of about 10° of angular misalignment therebetween.

14. A self-aligning coupling for mating a pair of corresponding flanged fittings, comprising:
    (a) a pair of arms adapted for pivotal connection between open and closed positions, the arms at least partially defining a mating groove adapted to receive at least potions of a pair of flanged fittings to be coupled;
    (b) a rotational assist mechanism linking the arms and adapted to move the arms such that the flanged fittings can be received in the mating groove as the arms are effectively pivoted to a closed position; wherein the first and second arms are rotatable about an axis which is substantially parallel to the facing planar surfaces of the flanged fittings and
    c) a clamp selectively affixing the arms in the closed position.

15. The self-aligning coupling of claim 14, wherein the rotational assist mechanism effectuates the closing of the first and second arms relative to the pair of flanged fittings by moving the first and second arms in synchronization.

* * * * *

UNITED STATES PATENT AND TRADEMARK OFFICE
CERTIFICATE OF CORRECTION

PATENT NO. : 6,834,892 B2
DATED : December 28, 2004
INVENTOR(S) : Joshua R. Kornau and James E. Kesterman It is certified that error appears in the above-identified patent and that said Letters Patent is hereby corrected as shown below:

<u>Column 10,</u>
Line 16, remove "further"
Line 17, change "half" to -- arm --
Line 20, change "said" to -- the --

Signed and Sealed this

Tenth Day of May, 2005

JON W. DUDAS
*Director of the United States Patent and Trademark Office*